3,537,775

SINGLE COMPONENT, TWO ELEMENT MAGNIFIER

Original Filed June 30, 1965

JAMES R. JOHNSON
JAMES E. HARVEY
RUDOLF KINGSLAKE
INVENTORS

BY William F. Delaney Jr.

Robert W. Hampton
ATTORNEYS

United States Patent Office 3,537,775
Patented Nov. 3, 1970

3,537,775
SINGLE COMPONENT, TWO ELEMENT MAGNIFIER
James R. Johnson, James E. Harvey, and Rudolf Kingslakes, Rochester, N.Y., assignors to Eastman Kodak Company, Rochester, N.Y., a corporation of New Jersey
Original application June 30, 1965, Ser. No. 468,265, now Patent No. 3,441,338, dated Apr. 29, 1969. Divided and this application Oct. 17, 1968, Ser. No. 844,677
Int. Cl. G02b 3/00
U.S. Cl. 350—233                    1 Claim

ABSTRACT OF THE DISCLOSURE

An accessory lens, having each of its principal points closer to its respective focal point than to the other focal point and having at least one of its principal points within the outside surfaces of the lens, is disclosed for use in an optical system to change the magnification of a primary lens in the system.

---

This is a division of application Ser. No. 468,265, filed June 30, 1965, now U.S. Pat. No. 3,441,338.

This invention relates to accessory lenses and their uses. More specifically, this invention relates to the design and use of an accessory lens to change the magnification of a photographic printing optical system without the need for refocusing the principal optical system.

A commercial photographic printer is often designed to work at specific conjugates for a specific magnification. With such a printer, if it is desired to work at a different magnification, as with a different size original, a complete new optical system must be used.

It is an object of this invention to provide a method for conversion of such a photographic printer to operate at a different magnification without the need for refocusing the basic optical system or moving either conjugate point.

It is another object of this invention to provide a well-corrected accessory lens that will allow such a conversion without introducing substantial aberrations into the overall printing optical system.

The former of the above objects is accomplished by placing an accessory lens of proper design in front of the original at a position such that the accessory lens creates an enlarged virtual image of the original in approximately the same plane as the original. The latter object is accomplished by foregoing traditional designs of such accessory lenses and instead designing them in the form of thick positive magnifiers.

For purposes herein the term component shall include a combination of elements cemented together or separated by only a small weak airspace and, of course, a single element not part of such a combination.

Figure 1:
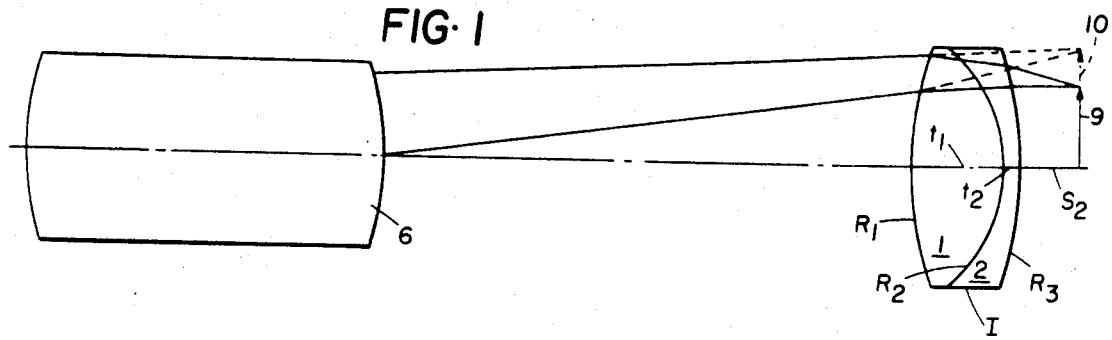
FIG. 1 is a diagrammatic axial cross section of a lens constructed and applied according to the invention in a manner to increase magnification.

According to FIG. 1 an unusually small object 9 is placed in a plane for projection by a primary focusing means, in this case a printing lens 6. The printing lens 6 and its image format are such that the format will be properly filled only with an object the height of arrow 10. An accessory lens I designed according to the invention is inserted at a position such that it forms a virtual image of object 9 the height of arrow 10 in the same plane as object 9. The printer will then work at the same conjugates as before with no refocusing of the printing lens 6 but at an increased magnification.

Figure 2:
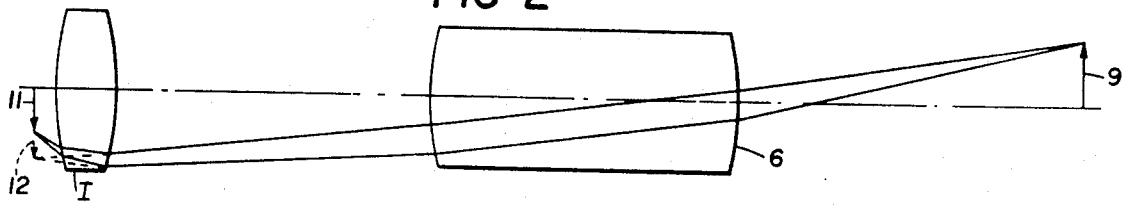
FIG. 2 is a diagrammatic axial cross section of a lens applied according to the invention in a manner to decrease magnification.

According to FIG. 2, if it is desirable to reduce the magnification, the accessory lens can be placed in front of the image plane in a similar manner. What would ordinarily be an image the height of arrow 12 is reduced to one the height of arrow 11.

The following is an explanation of the basic principles involved in such a lens which will aid in further understanding the part of this invention dealing with its design.

It has been pointed out in the optical literature that for each lens system there are two object positions where the image of the object lies in the same plane as the object. It is believed that this principle was first pointed out in Bravais, Annales de Chimie et de Physique (1851), vol. 33, p. 494. These positions have become known as Bravais points.

For a Bravais point to be useful in its application in this invention, it must be outside of the lens itself. Its position with any lens is dependent upon the location of the principal points of the lens relative to the focal points. In lenses in which the principal points coincide, the Bravais points also coincide at the principal points. In systems in which each principal point lies closer to the opposite focal point than to its own focal point, i.e., systems in which the two focal lengths overlap, the Bravais points lie between the principal points. This type of lens includes all negative lenses and many positive systems, including most of those of the Petzval type.

If each principal point lies between its respective focal point and the other principal point, as is normal for a biconvex lens, the Bravais points will lie outside of the principal points. In this case the wider apart the principal points of the lens, the closer the Bravais points will be to focal points of the lens and the higher will be the magnification at the Bravais point.

The position of the Bravais point for any lens system and the magnification at such point can be determined algebraically with the following formulas:

$$p = \frac{Z + \sqrt{Z^2 + 4Zf'}}{2}$$

$$p' = p - z$$

$$m = \frac{p}{p'}$$

where $p$ and $p'$ are the distances from the Bravais point to the respective principal points, $Z$ is the distance between the principal points, and $f'$ is the focal length of the lens.

Thus, in order to place a Bravais point outside of the lens, a lens designer must design either a lens which places one or both of the principal points outside of the lens or one in which the principal points (with non-overlapping focal lengths) are sufficiently wide apart to push a Bravais point outside the lens.

The original lens suggested by Bravais and all known lenses using the principle prior to this invention have solved this problem by using a widely spaced combination of thin lens components of opposite powers. This combination put both principal points outside of and on the same side of the lens. Such combinations have been poorly corrected, not approaching the quality necessary for printing or copying work.

We have obtained much beter results than those previously obtained by designing Bravais lenses in which at least one of the principal points is inside the lens and the other principal point is either inside the lens or relatively close to it. More specifically, in all of our examples at least half of the distance between the principal points is inside of the lens. The best corrections were obtained when both principal points were inside of the lens.

Consistent with this invention, the preferred design which places at least one Bravais point outside of the lens and gives the best corrections is the thick positive magnifier. It has fairly widely separated principal points which principal points lie closer to their respective focal points than to the opposite focal points. When designed using all positive components, it can be sufficiently well corrected to be used in high quality color printing work. If more than one component is used, the airspace separating them is preferably of positive power.

Such a magnifier is capable of excellent corrections for spherical aberration, chromatic aberration, flatness of field and distortion. The distance at which such an accessory lens is placed from the object can be varied according to the palcement of the principal points and will depend upon the physical requirements of the system and the magnification desired.

Figure 3:
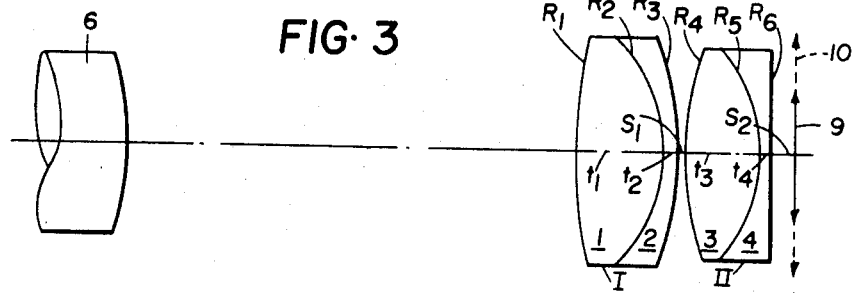
FIGS. 3 and 4 are diagrammatic axial cross sections of other accessory lenses constructed according to the invention.
Figure 4:
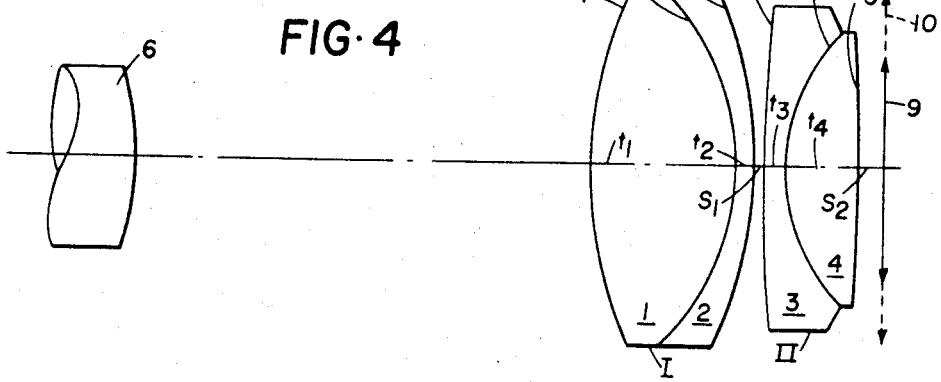

FIGS. 1, 3 and 4 show specific embodiments of the invention which are well corrected. In these figures and in all examples and claims below, from front to rear, the components are numbered from I to II, the elements are numbered from 1 to 4, the radii of curvature from $R_1$ to $R_6$ and the thicknesses from $t_1$ to $t_4$. $S_2$ is the separation from the rear surface of the accessory lens to the object, and $S_1$ is the separation between components of the lens, if any. The indexes of refraction N are for the D line of the spectrum and V is the dispersive index.

Well-corrected Bravais magnifiers suitable for use according to the invention can be constructed according to the following examples:

EXAMPLE 1 (FIG. 1)

[Magnification=1.40; Focal length=160 mm.]

| Component | Element | N | V | $R_1$-$R_3$ in mm. | $t_1$-$t_2$ in mm. |
|---|---|---|---|---|---|
| I | 1 | 1.617 | 54.9 | $R_1=+108.5$ | $t_1=27.9$ |
|   | 2 | 1.689 | 30.9 | $R_2=-44.3$ | $t_2=4.9$ |
|   |   |       |      | $R_3=-106.4$ |          |

In this example the preferred Bravais point is 17.5 mm. behind $R_3$ and each principal point is inside the lens.

EXAMPLE 2 (FIG. 1)

[Magnification=1.22; Focal length=100 mm.]

| Component | Element | N | V | $R_1$-$R_3$ in mm. | $t_1$-$t_2$ in mm. |
|---|---|---|---|---|---|
| I | 1 | 1.517 | 64.5 | $R_1=+367$ | $t_1=8.6$ |
|   | 2 | 1.689 | 30.9 | $R_2=-28.8$ | $t_2=2.7$ |
|   |   |       |      | $R_3=-47.4$ |          |

In this example the preferred Bravais point is 18.0 mm. behind $R_3$ and each principal point is inside the lens.

EXAMPLE 3 (FIG. 3)

[Magnification=1.70; Focal length=100 mm.]

| Component | Element | N | V | $R_1$-$R_3$ in mm. | $t_1$-$t_4$ in mm. |
|---|---|---|---|---|---|
| I | 1 | 1.617 | 54.9 | $R_1=+206$ | $t_1=35.3$ |
|   | 2 | 1.689 | 30.9 | $R_2=-61.5$ | $t_2=5.7$ |
|   |   |       |      | $R_3=-135$ | $S_1=2.3$ |
| II | 3 | 1.617 | 54.9 | $R_4=+135$ | $t_3=31$ |
|   | 4 | 1.689 | 30.9 | $R_5=-61.5$ | $t_4=5.7$ |
|   |   |       |      | $R_6=\infty$ |        |

In this example the preferred Bravais point is 8.65 mm. behind $R_6$ and both principal points lie inside the lens.

EXAMPLE 4 (FIG. 4)

[Magnification=1.58; Focal length=100 mm.]

| Component | Element | N | V | $R_1$-$R_6$ in mm. | $t_1$-$t_4$ in mm. |
|---|---|---|---|---|---|
| I | 1 | 1.526 | 54.6 | $R_1=+93.5$ | $t_1=38.3$ |
|   | 2 | 1.689 | 30.9 | $R_2=-59.4$ | $t_2=5.7$ |
|   |   |       |      | $R_3=-110$ | $S_1=1.4$ |
| II | 3 | 1.689 | 30.9 | $R_4=+380$ | $t_3=5.7$ |
|   | 4 | 1.617 | 54.9 | $R_5=+47.2$ | $t_4=18.4$ |
|   |   |       |      | $R_6=-354$ |        |

In this example the preferred Bravais point is 6.72 mm. behind $R_6$ and both principal points are inside the lens.

It should be noted that in Examples 2 and 3 the lens is placed so that the object and image in question are slightly displaced from each other. This is done to compensate for a glass plate which is removed when the lens is substituted. For purposes of describing and claiming this invention, it should be understood that such a variation does not prevent the object and image from being considered in substantially the same plane.

The invention has been described in considerable detail with particular reference to certain preferred embodiments thereof, but it will be understood that variations and modifications can be effected within the spirit and scope of the invention as described hereinbefore and as defined in the appended claim.

We claim:

1. A lens constructed according to the following specification wherein, from front to rear, I is the lens component, 1 and 2 are the lens elements, $R_1$ to $R_3$ are radii of curvature, $t_1$ and $t_2$ are thicknesses, N is the index of refraction for the D line of the spectrum and V is the dispersive index:

[Focal length=100 mm.]

| Component | Element | N | V | $R_1$-$R_3$ in mm. | $t_1$-$t_2$ in mm. |
|---|---|---|---|---|---|
| I | 1 | 1.517 | 64.5 | $R_1=+367$ | $t_1=8.6$ |
|   | 2 | 1.689 | 30.9 | $R_2=-28.8$ | $t_2=2.7$ |
|   |   |       |      | $R_3=-47.4$ |          |

References Cited

UNITED STATES PATENTS 1,794,419  3/1931  Richter _____ 350—233

DAVID SCHONBERG, Primary Examiner

R. J. STERN, Assistant Examiner